Aug. 1, 1967

HUGH L. DRYDEN, DEPUTY ADMINISTRATOR OF THE NATIONAL AERONAUTICS AND SPACE ADMINISTRATION 3,333,788

ARTIFICIAL GRAVITY SPIN DEPLOYMENT SYSTEM

Filed Oct. 22, 1965

BRADFORD P. DONOVAN
KENNETH G. ENGLAR
INVENTORS

BY
Howard B. Scheckman
ATTORNEYS

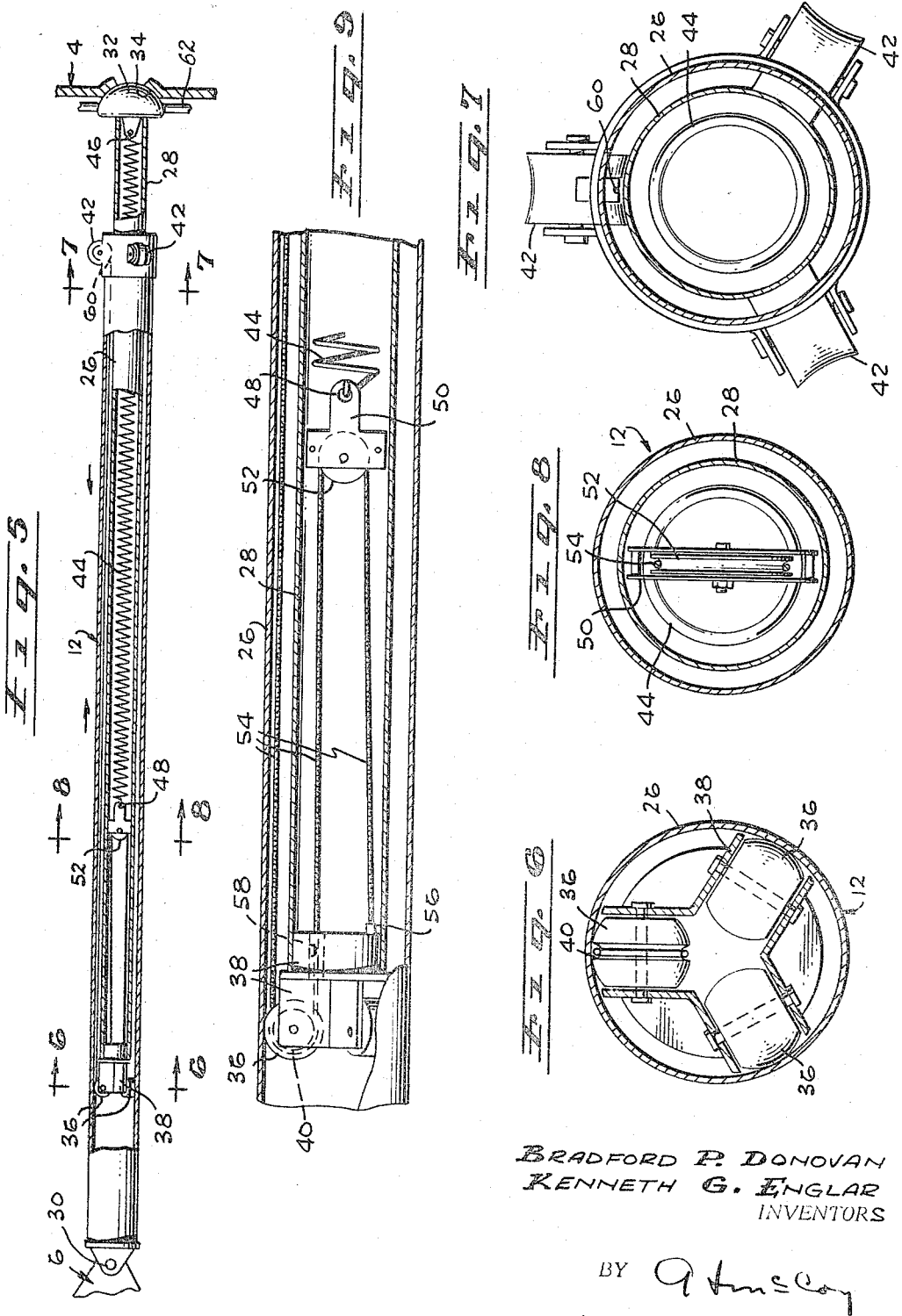

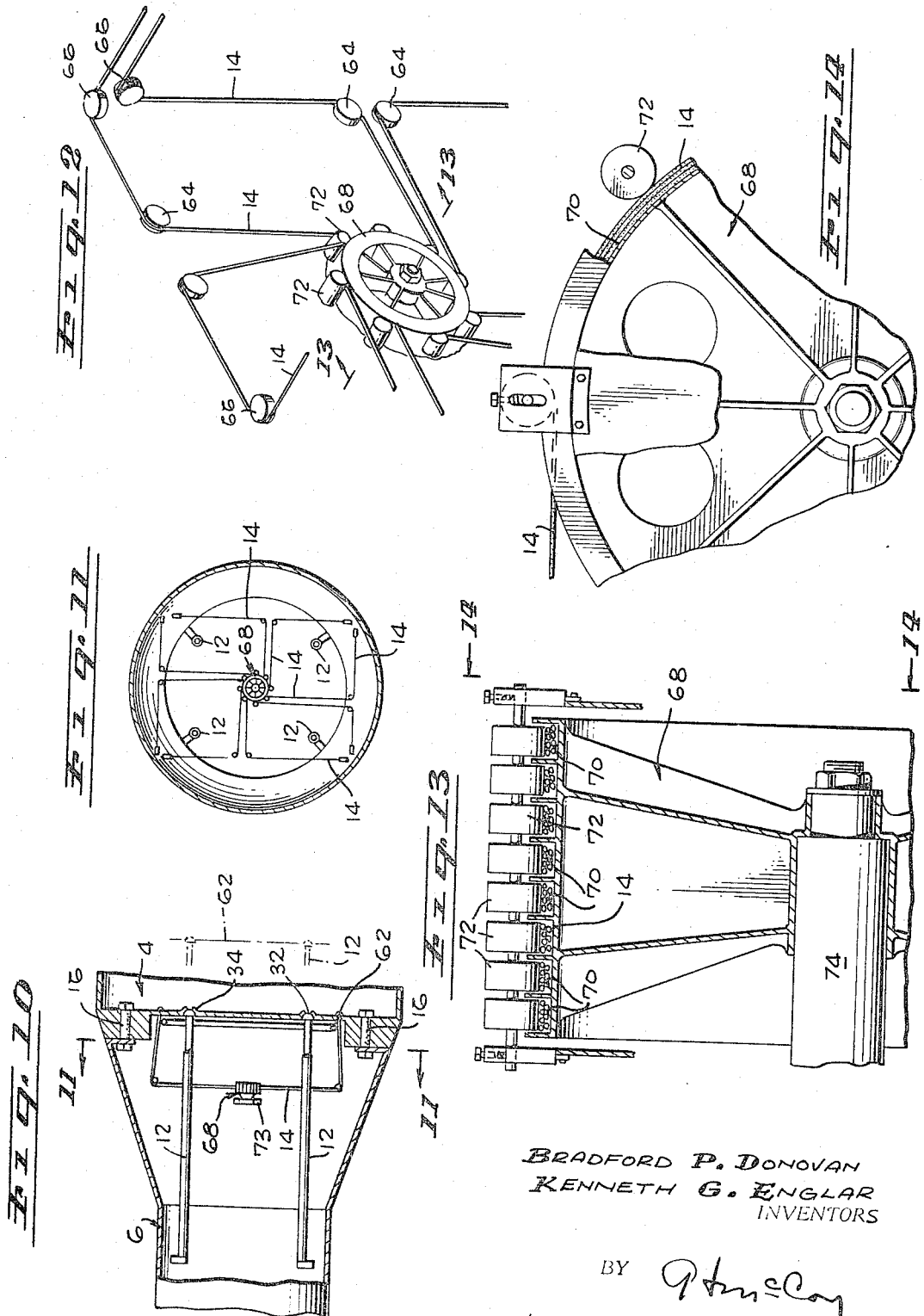

United States Patent Office 3,333,788
Patented Aug. 1, 1967

3,333,788
ARTIFICIAL GRAVITY SPIN DEPLOYMENT SYSTEM
Hugh L. Dryden, Deputy Administrator of the National Aeronautics and Space Administration, with respect to an invention of Bradford P. Donovan, Sepulveda, and Kenneth G. Englar, Pacific Palisades, Calif.
Filed Oct. 22, 1965, Ser. No. 502,709
8 Claims. (Cl. 244—1)

ABSTRACT OF THE DISCLOSURE

This invention relates to a way of providing an artificial gravity environment in a manned space vehicle. It utilizes presently available boosters as the space vehicle. Generally, when in space, the vehicle is rotated like a pinwheel and then is separated into two sections connected by a cable arrangement. The wheel action provides an artificial gravity. The further apart the sections are, the slower they can rotate and the less discomfort to the crew. A spring-urged strut arrangement is used during early separation of the two sections to provide positive control and resist bending of one section relative to the other. Cables cannot provide adequate resistance to bending when the two sections are close to each other.

---

This invention relates, in general, to manned space vehicles of a type designed to operate outside the earth's atmosphere for an appreciable length of time. More particularly, this invention is a manned spacecraft invention wherein provision has been made for establishing an artificial gravity environment by slowly rotating the spacecraft about its center of gravity. The centrifugal force developed by this rotation simulates gravity.

The phenomenon of weightlessness, which occurs during space flight, is still, to a large extent, an enigma to space scientists. Weightlessness encountered by astronauts in the various space flights undertaken to date has not resulted in any serious physiological difficulties on the part of the astronauts. However, these flights have been of relatively short duration as compared to the duration of planned future flights by astronauts inhabiting a spacecraft such as, for example, an earth orbiting laboratory or a space vehicle engaged in an interplanetary trip. It is not an established fact that prolonged weightlessness encountered in these future flights will present a problem; however, scientists who have made an exhaustive study of weightlessness share the general opinion that prolonged weightlessness will result in serious physiological and psychological problems on the part of the astronaut. Therefore, it is generally believed and accepted that a space vehicle designed for prolonged space flights must necessarily include a system for producing an artificial gravity environment.

There have been various proposals advanced for alleviating the undesirable effects of prolonged weightlessness. For example, it has been proposed to include a centrifuge-type device, in a space vehicle designed for interplanetary flight, that astronauts can enter at selected time intervals and subject themselves to artificial gravity forces. Another solution which has been presented to overcome the weightlessness problem, and one which is considered to have the most merit, is to slowly rotate the spacecraft about its center so as to generate a centrifugal force that simulates gravitational forces. There have been various configurations suggested to accomplish this. One suggestion is to fabricate the spacecraft with an annular shape and position thrust rockets around the periphery thereof that are periodically pulsed to impart a desired degree of rotation to the annular spacecraft. Another suggested configuration is one where the laboratories and other areas occupied by the crew will be in the form of a spoke-like section that extends radially from a central hub. The entire spacecraft would be rotated about the center of the hub portion.

The various suggested solutions are feasible and have considerable merit; however, they each require a very considerable amount of structure which would be heavy and occupy considerable volume. The weight and volume requirements would, particularly during the launch phase wherein the spacecraft were being put into orbit, present serious problems.

A spacecraft constructed in accordance with the principles of this invention, as discussed hereinafter, is capable of providing an adequate artificial gravity environment and yet its weight and volume dimensions are such that it can be placed in orbit by available booster vehicles. This is accomplished by providing a spacecraft which, after attaining orbit, can be separated into two connected sections (one of the sections being an occupied capsule and the other a burned out section of the booster vehicle). The capsule is coupled to the booster section by a cable and strut arrangement. When in orbit, the capsule and booster are separated by first activating explosive bolts which attach them together. The capsule and booster sections are then rotated about their common center of gravity. This rotation produces a centrifugal force that tends to separate the two sections. During the initial stages of the separation, the relative position of the capsule and booster sections are rigidized by a strut assembly mounted on the capsule section, and in engagement with the booster section during the first few feet of separation. The rate of separation is controlled by a winch and cable mechanisms mounted on the capsule section and connected to the booster section. The later stages of the extension or separation of the two sections of the spacecraft is controlled by the cable and winch assembly alone since this is the only connection between the two sections of the spacecraft.

It is, therefore, a principle object of this invention to provide a spacecraft capable of providing its own gravity environment while in space.

A yet further object of this invention is to provide a spacecraft having two separable sections which can be deployed in space to provide an artificial gravity environment.

Another object of this invention is to provide a spacecraft having separable sections and includes apparatus for maintaining positive control over the two sections of the spacecraft during deployment thereof.

Yet another object of this invention is to provide a spacecraft having a deployment mechanism that has a high inherent reliability and is failsafe.

A further object of this invention is to provide a spacecraft, including suitable apparatus for generating an artificial gravity environment, that is compatible for use with existing, or state-of-the-art, booster vehicles.

Other objects and attendant advantages of this invention will become more apparent when considering the following detailed description, in conjunction with the accompanying drawings wherein:

FIGURE 5 is a view of one of the struts, with a portion shown in cross section;

FIGURE 6 is an enlarged sectional view of FIGURE 5, taken in the direction of arrows 6—6, showing the rollers carried by the inner strut cylinder;

FIGURE 7 is an enlarged sectional view of FIGURE 5, taken in the direction of arrows 7—7, showing the rollers carried by the outer strut cylinder;

FIGURE 8 is an enlarged sectional view of FIGURE 5, taken in the direction of arrows 8—8, showing the pulley carried within the inner strut cylinder;

FIGURE 9 is an enlarged sectional view of a portion of FIGURE 5 showing part of the strut spring system;

FIGURE 10 is a sectional view of a portion of the capsule and booster showing the releasable attachment means and strut connection prior to separation;

FIGURE 11 is a sectional view of FIGURE 10, taken in the direction of arrows 11—11, showing the cable system and guard ring;

FIGURE 12 is an enlarged perspective view of the winch, cables, and pulleys shown in FIGURE 11;

FIGURE 13 is an enlarged sectional view of a portion of FIGURE 12, taken in the direction of arrows 13—13, showing the winch and idler rollers in engagement with the cables;

FIGURE 14 is a view of FIGURE 13, taken in the direction of arrows 14—14, showing the spring-urged idlers in engagement with the cable carried by the winch.

SPECIFIC DESCRIPTION

Figure 1:
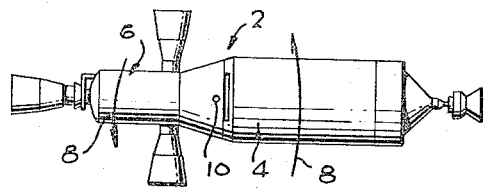
FIGURE 1 shows a booster and capsule connected together prior to separation.

Referring to FIGURE 1, there is shown a vehicle 2 in space, to illustrate the deployment system of the invention. The space vehicle comprises a first body section 4 that may be the burned out booster, and a second body section 6 that may be a capsule or lab. They are rigidly connected together after having been put into orbit in space.

The capsule or laboratory is to serve as a manned orbiting station. The purpose of this invention is to create an artificial field of gravity for the occupants in the capsule, to prevent any undesirable effects that might result due to prolonged weightlessness.

To help explain the system, first its overall operation will be described, and then the specific construction of the various system components will be explained.

First stage

The first stage in the deployment system is to spin booster 4 and capsule 6, similar to a pinwheel to build up the centrifugal force so it will aid in separating them. With both bodies rigidly connected, this can be easily accomplished.

Thrustors (not shown) on the booster and capsule are initiated to start the spacecraft spinning in the direction of arrows 8 about its center of gravity 10. The center of gravity will be located somewhere between the bodies, depending on their relative weights. Once the space vehicle is rotating at the desired revolutions per minute, it will produce the required centrifugal force to urge the bodies apart, and will also create an artificial gravity for the occupants of the capsule. The next stage is to separate the capsule and booster.

Second stage

Figure 2:
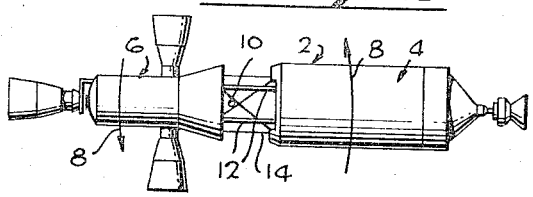
FIGURE 2 shows initial separation between capsule and booster, with struts extended.

Shown in FIGURE 2 is the second stage in separating the capsule and booster. This stage involves the use of rigid separation control means in the form of spring-urged struts 12 and flexible connecting means including cables 14 to guide the bodies during separation.

First, to permit separation (FIGURE 10), releasable attachment means in the form of explosive bolts are fired to disconnect the booster and capsule to permit separation. Then spring-urged rigid struts 12, carried by the capsule and in abutting engagement with the booster, expand (shown in dotted lines FIGURE 10) to separate the booster and capsule.

There are eight cables connected between the booster and capsule. As the booster and capsule rotate, centrifugal force continues to separate them while the cables are played out. In this stage the struts maintain alignment of the capsule and booster.

Final stage

Figure 3:
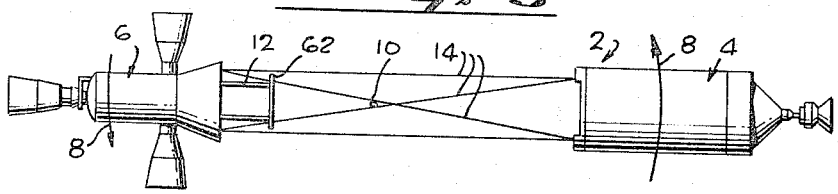
FIGURE 3 shows capsule and booster after complete separation.
Figure 4:
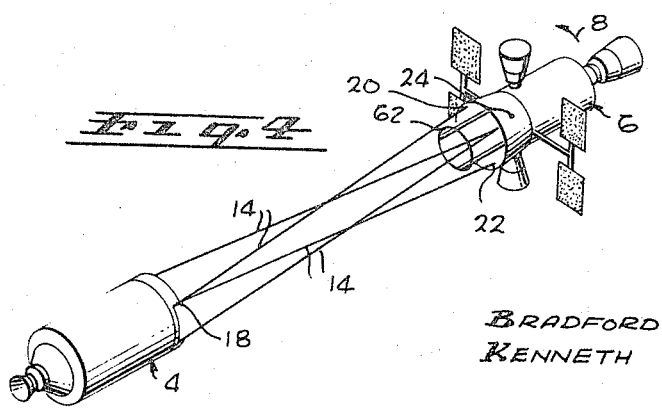
FIGURE 4 is a perspective view of the completely separated capsule and booster showing how cables are interconnected.

In the third or final stage, the cables take over in supporting the capsule and booster. They continue to move apart, until they are fully separated, as shown in FIGURES 3 and 4. They are now interconnected solely by cables 14.

While it is difficult to see in the figures, each cable is connected on a diagonal to provide the desired truss structure, and so they will all be the same length. That is (referring to FIGURE 4), point 18 on the booster is connected to the capsule by a cable to point 20 and by a cable to point 22 on the capsule. Point 18 is not connected to point 24 directly opposite it, but is connected to the point on each side of it.

When the spacecraft is fully deployed, as shown in FIGURE 4, thrustors (not shown) are employed to maintain the spacecraft rotating about its center of gravity to provide the desired artificial gravity in the capsule portion.

This system combines the best advantages of an all strut and all cable system. At small separation distances, the struts provide the necessary stiffness and provide positive positional control by reacting against the cable tension.

Struts are necessary because, although at small separation distances, the geometry of eight deployment cables operates very favorably with respect to stiffness and torsion between the two bodies; there is a problem of protecting against bending. At this close distance, the diagonal cross-angling of the cables become exaggerated to the point where the cables are nearly perpendicular to the connecting axes of the bodies and contribute little to the longitudinal, and therefore bending (yaw) stiffness. the short struts complement the system to reinforce the yawing stiffness.

At large separation distances, the cable truss provides the desired rigidity. This is at far less weight and less mechanical complexity than could be provided by long unwieldly struts.

The following is an example of the relative weights and distances that could be involved in using present propulsion systems. Assume that the capsule weighs approximately 50,000 pounds, and the booster approximately 35,000 pounds after exhausting its fuel. The capsule and booster would be deployed at a distance of approximately 142 feet to create an artificial gravity of .6 g. This would require a rate of rotation of 3.73 r.p.m. The length that strut 12 would have to extend to maintain alignment during initial separation would be approximately eight feet.

The general deployment of the capsule and booster has just been described, now the specific construction of the components will be described.

Rigid separation control means

Referring to FIGURES 5–9, there is shown one of the four struts 12, of the rigid separation control means used in the initial separation of the capsule and booster. The struts control alignment between the capsule and booster during the initial stage of separation. The strut comprises an outer tubular member or cylinder 26 and an inner tubular member or cylinder 28 telescopically carried within it. Outer cylinder 26 is connected, at point 30, to capsule 6. Inner cylinder 28 has connected to its end, means in the form of a cone-shaped bumper 32. This abuts against a cone-shaped socket or depression 34 in booster 4 to maintain alignment between the capsule and booster. Inner cylinder 28 extends relative to cylinder 26 to separate capsule 6 from booster 4.

Since the strut is used in space, it is designed so that when the cylinder extends there will be as little sliding contact between the cylinders as possible. This is to prevent cold welding between the cylinders. For this reason, inner cylinder 28 is supported on rollers so as to roll relative to the outer cylinder.

Fixed to the bottom of cylinder 28 are rollers 36 carried by support 38. These roll on the inside of cylinder 26. One of the rollers is provided with a groove 40 on which a cable can ride, as will be described later on in connection with the spring system. Outer cylinder 26 carries at its upper end (right side of FIGURE 5) a plurality of rollers 42 that engage inner cylinder 28. These rollers extend through the wall of cylinder 26. They have curved surfaces that are complementary to, and engage the outside of inner cylinder 28. It can be seen that rollers 36 and 42 cooperate to support inner cylinder 28 for rolling movement relative to the outer cylinder 26.

A spring system is used to extend the strut. It includes resilient means in the form of a spring 44 that has one end hooked through opening 46 in bumper 32, and, its other end hooked through opening 48 in lower movable support 50 carried inside cylinder 28. Support 50 carries a pulley 52. A rope 54 has one end 56 fixed to support 38, the rope then encircles pulley 52, passes through an opening 58 in support 38, rides around groove 40 in wheel 36, and has its other end 60 fixed to outer cylinder 26. Spring 44 tries to pull pulley 52 to the right in FIGURE 9, since end 60 of the rope is fixed, this, in turn, causes inner cylinder 28 to move outwardly relative to cylinder 26.

To reinforce the ends of the struts (also referring to FIGURES 4 and 10), and to prevent the cables from getting twisted on a strut, there is provided a reinforcing member in the form of ring 62. The ring is circular and interconnects the ends of the struts to maintain the ends in fixed position relative to each other. The ring also serves to prevent cables 14 from becoming twisted as they play out during separation.

*Flexible connection means*

Referring to FIGURES 10–14, the flexible connection means is shown. As mentioned before, it consists essentially of eight cables 14 arranged in a truss network. The cables extend between capsule 6 and booster 4. At the capsule end, the cables pass through a pair of pulleys 64, 66, adjacent to each of the struts, and from there the cables are routed to winch 68.

The cables have identical geometries, permitting the use of a single winch for all eight cables. Winch 68 (FIGURE 13) consists of a large diameter spool with eight sections 70, one for each cable. Each cable is attached to the winch with a bolted connection (not shown). The winch is designed so a complete length of cable can be wrapped around the spool. The cables are held against the winch by spring-urged idler rollers 72 to keep the cables taut. Means in the form of a motor 73 (FIGURE 10) is connected to shaft 74 to control rotation of winch 68. The motor can be controlled by automatic or manual means (not shown) to control deployment of cables 14.

The winch may be provided with a mechanical stop (not shown) to limit the maximum deployment distance, and a large friction brake (not shown) may be used to stop the winch to maintain deployment distances less than the maximum. This brake may also be used as an emergency control, if necessary.

The cable system is designed to permit the capsule to be rotated, even in the unlikely event of two broken cables.

OPERATION

The deployment system is best described through an explanation of its operation. With capsule 6 and booster 4 connected (FIGURE 1), they are rotated to bring them up to the required speed. Explosive bolts 16 (FIGURE 10) are then fired to permit the capsule and booster to be separated by centrifugal force and spring-urged struts 12.

Initial separation of the capsule and booster is controlled by means of cables 54 and spring 44 within each strut 12. Each strut is fixed to capsule 6 and carries a bumper 32 that abuts a cone-shaped depression 34 on the booster. As the struts extend to their full length they maintain the capsule and booster aligned, while, with the aid of centrifugal force, they separate the capsule and booster. Positive control of deployment distance is provided by reacting the spring-loaded struts against the eight cable truss system that is controlled by the rotation of winch 68. During this separation, spin rockets (not shown), on both the capsule and booster, are pulsed to maintain the selected spin rate.

When the struts have been extended to their full length, the tension force on the cable, due to centrifugal force, is enough to satisfy the rigidity requirement of the deployment system. Deployment is then continued using winch 68 alone to control deployment of the cables. As separation distance increases, and while the cables are played out, the spin rockets are pulsed to maintain the selected rotational velocity. When the full deployment distance is achieved, the spin rockets are pulsed to produce the desired final acceleration level.

With this system, the deployment and spinup time can be made sufficiently large to prevent crew discomfort during separation. Further, separation distances and rotational rates may be independently controlled during all phases of deployment to permit independent assessment of the gravitational field and effects on the crew.

To retract the booster and capsule, the operation is reversed. Winch 68 is wound up to take in the eight cables. Struts 12 now act as shock absorbers to absorb the impact of the booster and capsule coming together. When bumpers 32, carried on struts 12, engage cone-shaped depressions 34, they now act as guides to prevent misalignment during retraction.

Although the present invention has been described, and illustrated with respect to a specific embodiment, it will be appreciated that various modifications and variations may be made without departing from the spirit and scope of the invention. Thus it is not intended to limit the invention except by the terms of the following claims.

What is claimed is:

1. A space vehicle adapted to provide an artificial gravity environment for occupants of the vehicle, said vehicle comprising:
   (a) a first body section;
   (b) a second body section;
   (c) releasable attachment means connecting said first and second body sections;
   (d) thrust generating means mounted on a body section for rotating said space vehicle about its center of gravity to develop a centrifugal force that separates said first and second body sections upon release of said attachment means;
   (e) rigid separation control means attached to one of said body sections and in engagement with said other body sections during the initial stages of separation to control the alignment of said first and second body sections; and,
   (f) flexible connection means connected between said first and second body sections to control the rate of separation during the initial stages of separation, and further, to permit additional separation at a controlled rate until a preselected separation distance has been achieved between said first and second body sections; whereby, rotation of the separated first and second body sections about the center of gravity of the vehicle will generate a centrifugal force that simulates gravity.

2. A space vehicle, as recited in claim 1, wherein said rigid separation control means includes:
   (a) a plurality of extensible struts, each strut having one end thereof fixed to said second body section and the other end thereof in engagement with said first body section when said first and second body sections are connected, and during the initial stages of separation;

(b) alignment cones mounted on the ends of said struts that engage said first body section; and, (c) alignment sockets in said first body section that mate with said alignment cones when said struts engage said first body section.

3. A space vehicle, as recited in claim 2, wherein each of said plurality of extensible struts includes:

(a) a first member connected at one end thereof to said second body section, (b) a second member telescopically disposed within said first member, said second member having said alignment cones mounted on one end thereof; and (c) resilient means connected between said first and second members for moving said second member with respect to said first member in separating the first and second body sections of the space vehicle.

4. A space vehicle, as recited in claim 1, wherein said flexible connection means includes:

(a) a winch mounted on said second body section, (b) means to control rotation of said winch; and (c) a plurality of cables wound on said winch, each of said cables having one end thereof connected to said first body section, whereby, upon release of said attachment means connecting said first and second body sections, said winch is rotated to play off said plurality of cables and permit said first and second body sections to separate due to the centrifugal force generated when said space vehicle is rotated.

5. A space vehicle adapted to provide an artificial gravity environment for occupants of th vehicle, said vehicle comprising:

(a) a first body section;

(b) a second body section;

(c) releasable attachment means connecting said first and second body sections;

(d) thrust generating means mounted on a body section for rotating said space vehicle about its center of gravity; whereby a centrifugal force will be developed that separates said first and second body sections upon release of said attachment means;

(e) a first member connected at one end to said second body section;

(f) a second member disposed within said first member, said second member abutting said first body section; and (g) resilient means connected between said first and second members for moving said second member, with respect to said first member, to separate said first and second body sections of the space vehicle, upon release of said releasable attachment means during the initial stages of separation to control the alignment of said first and second body sections; and (h) flexible connection means connected between said first and second body sections to control the rate of separation during the initial stages of separation, and further, to permit additional separation at a controlled rate until a preselected separation distance has been achieved between said first and second body sections; whereby, rotation of the separated first and second body sections about the center of gravity of the vehicle will generate a centrifugal force that simulates gravity.

6. A space vehicle adapted to provide an artificial gravity environment for occupants of the vehicle, said vehicle comprising:

(a) a first body section;

(b) a second body section;

(c) releasable attachment means connecting said first and second body sections;

(d) thrust generating means mounted on a body section for rotating said space vehicle about its center of gravity to develop a centrifugal force that separates said first and second body sections upon release of said attachment means;

(e) a plurality of extensible struts having one end thereof fixed to one body section and the other end thereof in engagement with the other body section, when said first and second body sections are connected, and during the initial stages of separation;

(f) a reinforcing member secured at spaced intervals to the plurality of struts at a position closely adjacent to the ends that are in engagement with said other body section;

(g) alignment cones mounted on the ends of said struts that are in engagement with said other body section;

(h) alignment sockets in said body section that mate with said alignment cones when said struts engage said other body section;

(i) a winch mounted on one of said body sections;

(j) means to control rotation of said winch; and (k) a plurality of cables wound on said winch, each of said cables having one end thereof connected to said other body section; whereby, upon release of said attachment means connecting said first and second body sections said winch is rotated to play off said plurality of cables and permit said first and second body sections to separate due to the centrifugal force generated when said space vehicle is rotated.

7. A space vehicle adapted to provide an artificial gravity environment for occupants of the vehicle, said vehicle comprising:

(a) a first body section;

(b) a second body section;

(c) releasable attachment means connecting said first and second body sections;

(d) thrust generating means mounted on a body section for rotating said space vehicle about its center of gravity to develop a centrifugal force that separates said first and second body sections upon release of said attachment means;

(e) a first member connected at one end to said second body section;

(f) a second member telescopically disposed within said first member, said second member abutting said first body section;

(g) resilient means connected between said first and second members for moving said second member with respect to said first member when the first and second body sections of the space vehicle are separated upon release of said attachment means, said first and second members controlling the alignment of said first and second body sections during the first stage of separation;

(h) a winch mounted on said second body section;

(i) means to control rotation of said winch; and (j) a plurality of cables wound on said winch, each of said cables having one end thereof connected to said first body sections; whereby, upon release of said attachment means connecting said first and second body sections, said winch is rotated to play off said plurality of cables and permit said first and second body sections to separate due to the centrifugal force generated when said space vehicle is rotated.

8. A space vehicle adapted to provide an artificial gravity environment for occupants of the vehicle, said vehicle comprising:

(a) a first body section;

(b) a second body section;

(c) releasable attachment means connecting said first and second body sections;

(d) thrust generating means mounted on a body section for rotating said space vehicle about its center of gravity; whereby, a centrifugal force will be developed that separates said first and second body sections upon release of said attachment means;

(e) a plurality of first tubular members, each connected at one end thereof to said second body section;

(f) a plurality of second tubular members, each telescopically disposed within each of said first tubular members;

(g) resilient means connected between each of said plurality of first and second tubular members, for moving said second tubular members with respect to said first tubular members to aid in separating the first and second body sections of the space vehicle;

(h) a reinforcing ring member secured at spaced intervals to the plurality of second tubular members at a position closely adjacent to the ends that engage said first body section;

(i) a plurality of alignment cones, one mounted on the end of each of said plurality of second tubular members to engage said first body section;

(j) a plurality of alignment sockets in said first body section, one to mate with each of said alignment cones when said second tubular members engage said first body section;

(k) a winch mounted on said second body section;

(l) a motor to control rotation of said winch;

(m) a plurality of cables wound on said winch, each of said cables having one end thereof connected to said first body section; whereby, upon release of said attachment means connecting said first and second body sections said winch is actuated to play off said plurality of cables and permit said first and second body sections to separate due to the centrifugal force generated when said space vehicle is rotated.

References Cited

UNITED STATES PATENTS 2,977,080  3/1961  Von Zborowski _____ 244—2 X

FERGUS S. MIDDLETON, *Primary Examiner.*